R. G. HOTSINPILLER.
TRANSMISSION GEARING.
APPLICATION FILED OCT. 26, 1916.
1,271,319.
Patented July 2, 1918.
2 SHEETS—SHEET 2.
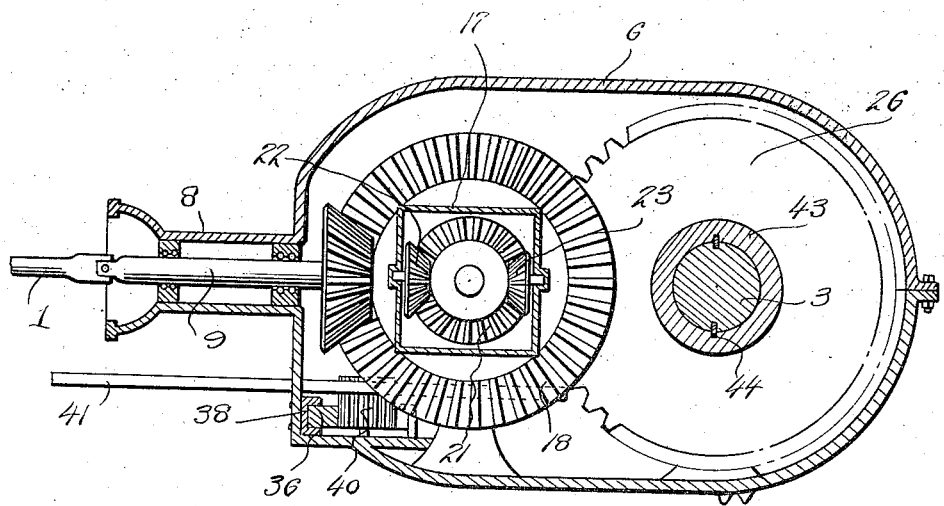
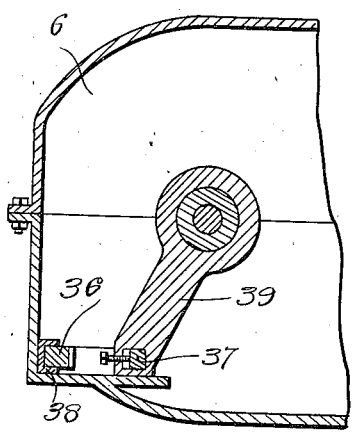
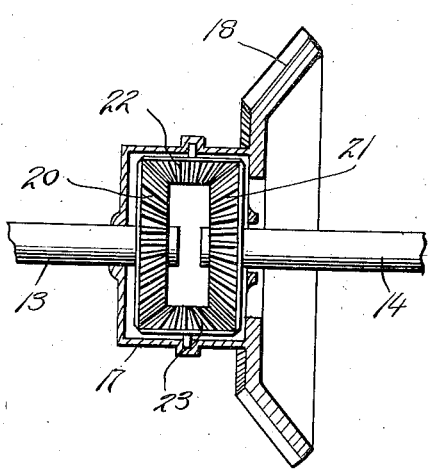
WITNESSES.
Chas. E. Kemper.
Lloyd W. Patch
INVENTOR.
Rolandus G. Hotsinpiller.
BY
Richard B. Owen,
ATTORNEY.

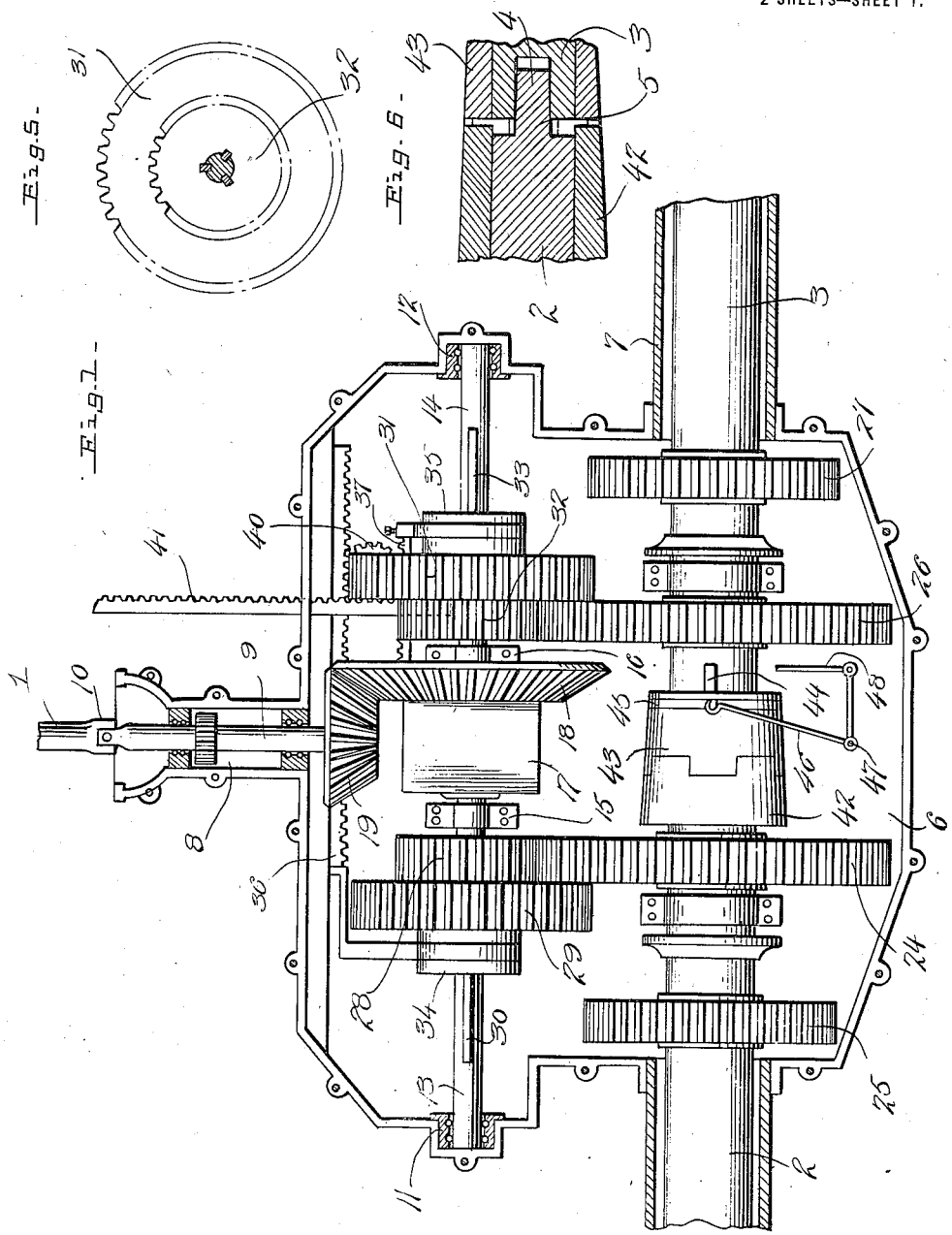

UNITED STATES PATENT OFFICE.

ROLANDUS G. HOTSINPILLER, OF BRIDGEPORT, ILLINOIS.

TRANSMISSION-GEARING.

1,271,319.    Specification of Letters Patent.    Patented July 2, 1918.

Application filed October 26, 1916. Serial No. 127,875.

*To all whom it may concern:*

Be it known that I, ROLANDUS G. HOTSINPILLER, a citizen of the United States, residing at Bridgeport, in the county of Lawrence and State of Illinois, have invented certain new and useful Improvements in Transmission-Gearing, of which the following is a specification.

This invention relates to an improvement in transmission gearing, and more particularly to a gearing of this nature which is adaptable for use in connection with the drive of a motor vehicle.

An object of my invention is to provide a transmission gearing embodying a differential, which is so arranged that it may be applied to accomplish the drive upon a motor truck or other motor propelled vehicles requiring the accomplishment of the transmission of a maximum of driving power, and one which thus particularly adapts itself for use in connection with the chassis and power plant of a pleasure vehicle which is to be remodeled into a truck or other commercial machine.

A further object of my invention is to so construct the parts that the change speed and the differential gearing are inclosed in a single housing and are thus centralized, and to provide means by which the wheel shaft as connected with the two sides of the differential can be locked to turn together and thus when an unusually severe load is placed upon the machine, the pull in mud holes and at other like points can be coupled together in a manner that both wheels will be positively driven and neither wheel will be permitted to spin.

A still further object is to provide means by which the transmission gearing from the differential to the wheel or drive shaft will be simultaneously shifted to thus insure that both sides of the differential will be equally connected with the load and with the drive shaft.

With the above and other objects in view, my invention consists in certain novel features of construction and combinations of parts which will be hereinafter set forth in connection with the drawings and then more particularly pointed out in the claims.

In the drawings:

Figure 1 is a horizontal sectional view through the housing incasing the differential and transmission gearing.

Fig. 2 is a longitudinal vertical sectional view through this casing and taken across the differential and drive shaft.

Fig. 3 is a fragmentary sectional view to better disclose a portion of the gear housing means.

Fig. 4 is a sectional view showing in detail construction the arrangement of the differential.

Fig. 5 is a detail view to better illustrate the construction of the change speed gearings which are carried on the differential shaft.

Fig. 6 is a fragmentary detail view to better disclose the manner of connecting the two portions of the power shaft by locking the same rigidly together.

As has been stated, this device is perhaps particularly adaptable for use in converting a Ford, or other pleasure vehicle of the passenger carrying type, into a truck or commercial vehicle, and therefore as the description progresses I will set forth the manner in which the device of my invention would be embodied in such use. Where this transmission and differential gearing is to be embodied with the power plant and chassis of a standard vehicle which is being remodeled, it will of course be understood that it is preferable that the frame be lengthened so that as the new drive axle may be fitted in place with the transmission mechanism, the load will be practically centralized over this drive axle to attain a better support of the load and a better driving force, and to this end, it is desirable that an extended frame be secured in conjunction with the regular frame of the vehicle by being bolted, riveted, or otherwise secured to the side members thereof, and that the drive shaft 1 extending from the engine be left of substantially the same length as in the original construction of the machine.

It is further desirable that the drive axle be constructed to accomplish driving only and that the differential be not included in the structure, and further with the load supported as is above set forth, this drive axle constituting the axle sections 2 and 3 must be made of greater strength than the standard axle of the vehicle as constructed as a pleasure machine. This two-part drive axle has the parts 3 thereof provided with a central bore or socket 4 at its inner end and a pin or tenon end is provided at 5 on the section 2 of the axle, so that the two sections of the axle will be held in alinement at all times irrespective of whether these sections may be turned together or one turned at a greater speed than the other. A housing, generally indicated at 6, is provided to receive and incase the transmission and the differential gearing, and it will of course be understood that the axle made up of the sections 2 and 3 will be mounted in suitable bearings in this casing 6 and that the axle housing as indicated at 7 be provided to incase those portions of the axle which extend on each side of the gear housing 6.

The gear housing 6 is made of such size that a space is left forward of the mounting of the drive axle, and a bearing sleeve 8 is provided to extend from the forward part of the casing to receive the connecting shaft 9, which is coupled through the universal joint 10 to be driven with the power shaft 1, it of course being understood that this bearing sleeve would be connected with a suitable housing arranged to inclose the power shaft.

Bearings as indicated at 11 and 12 are provided in the casing or housing so that the mounting of the drive axle, and the sections 13 and 14 of the differential shaft are mounted in these bearings and in the bearings 15 and 16 which are provided within the housing, these sections of the differential shaft being thus journaled in such a relation that they extend parallel with the extent of the sections of the drive axle. A differential casing 17, the arrangement of which is better shown in Fig. 4, is formed in conjunction with the bevel gear 18, and this casing and the bevel gear are mounted around the ends of the sections 13 and 14 of the differential shaft in such relation that they are ordinarily permitted to have free turning movement. A bevel gear 19 is secured on the inner end of the connecting shaft 9 in such relation that it meshes with the bevel gear 18 having the differential casing 17 carried thereby and thus as the power shaft 1 is turned in either the forward or reverse direction, turning movement is imparted to the bevel gear 18 and to the casing 17, it of course being understood that through the loose mounting of the parts on the sections 13 and 14 of the differential shaft this turning movement will not be directly transmitted to the shaft. The bevel gears 20 and 21 which are of the same size are mounted on the inner ends of the sections 13 and 14 of the differential shaft in such relation that they are disposed within the differential casing 17, and idler gears 22 and 23 are mounted in conjunction with the casing 17 in a relation that they each mesh with both the gear 20 and the gear 21, the parts being thus so intergeared that one section of the differential shaft will be permitted to have more rapid turning movement than the other section as is the usual operation of the differential shaft. To all intents and purposes, the differential of the machine being remodeled might be employed, although due to the fact that the parts must operate together as a unit, it is of course advisable that all of the parts within the casing or housing 6 be installed so that the differential and transmission mechanism can be installed as a completed unit.

The section 2 of the drive axle has a large gear wheel 24 keyed or otherwise secured thereon, and a smaller gear wheel 25 is also secured on this portion of the drive axle, corresponding gears 26 and 27 being secured on the section 3 of the drive axle. The gear wheels 28 and 29, which are secured together as a unit are mounted on the shaft 13 to be capable of sliding movement and are held against turning movement thereon through the medium of the splines or keys 30. The large and small gears 31 and 32 are mounted on the section 14 of the differential shaft and have sliding movement thereon, the splines 33 being provided to hold the unitarily connected gear wheels against turning movement. The gear wheels 29 and 31 are made of such size that they will mesh with the gear wheels 25 and 27 carried by the sections of the drive axle, as the pairs of gears are moved outwardly upon the sections 13 and 14 of the differential shaft, and the gears 29 and 32 are of such size that they mesh with the gears 24 and 26 when the pairs of gears are brought to the extreme position of inward setting as is illustrated in Fig. 1.

It is desirable that some means be provided by which the two sets of gears as mounted on the sections 13 and 14 of the differential shaft shall be simultaneously and equally moved to accomplish the shifting of the gears into mesh or to throw the gears to an intermediate position in which the sections of the drive axle are free, and to accomplish this purpose, I provide the grooved hubs 34 and 35 in connection with the sets of gears mounted on the differential shaft with the shifting rods 36 and so connected in the grooves of the hubs 34 and 35 that as these rods are simultaneously moved either outwardly or inwardly the sets of gears will be simultaneously shifted. The bars or rods 36 and 37 are mounted in proper bearings as shown at 38 in Fig. 3, and the parts 39 which connect these rods with the grooved hubs are made of such length that the rods are spaced apart somewhat. An idler gear wheel 40 is mounted between the rods 36 and 37 with the teeth thereof in mesh with the rack portions of these rods, and a shifting rack bar 41 is mounted in suitable bearings in the casing 6 and is meshed with the wheel 40 so that as this shifting rack bar 41 is given movement in either direction lengthwise, the gear wheel 40 will be turned and through the meshing of this gear wheel with the teeth of the rods 36 and 37, these rods will be extended or drawn in in such relation that the pairs of gear wheels will be shifted.

The section 2 of the drive axle has the member 42 of a connectng clutch secured on the inner end thereof and a mating clutch member 43 is mounted on the inner end of the section 3 of the drive axle to be capable of sliding movement into and out of locking engagement with the clutch member 42, a spline 44 being provided to secure this clutch member 43 against turning movement on the section 3 of the axle. A collar 45 is mounted around the clutch member 43 and a substantially bell crank shaped shifting lever 46 is pivotally mounted as at 47 within the casing 6 and has connection with this collar 45 so that as the bell crank shaped lever 46 is swung around its pivotal mounting the clutch member 43 will be shifted into and out of pressing engagement with the clutch member 42, a draw rod 48 being provided to be manually actuated to give the desired shifting movement to this bell crank lever 46.

In the use of the structure of my invention, the device might be embodied in a motor vehicle as the same is constructed at the factory or might be incorporated in the remodeling of a pleasure or passenger car to adapt the same for use as a truck or commercial machine, and it will of course be understood that the axle housing and the gear casing will be suitably connected and braced or trussed, that the proper connection of the parts with the frame will be made, and that load springs will be connected between the frame and this driving structure in a manner calculated to thus accomplish the mounting of the wheels. The rods 41 and 48 will be extended to points where they will be acceptable to the operator or will be connected to suitable operating means and thus when it is desired to shift the gears on the differential shaft to such a position that they mesh with either the large or small gears carried by the two-part drive axle, this rod 41 will be moved in the one direction or the other to cause turning of the gear wheel 40 and through the mesh of this wheel 40 with the rack portions of the rods 36 and 37, the pair of gear wheels will be shifted in the one direction or the other simultaneously so that they will be brought to connect both sections of the differential with either the large or small gears carried by the sections of the drive axle. This connection of the parts is such that under ordinary conditions the proper drive will be transmitted from the power shaft 1 to the drive axle constituting the sections 2 and 3, and at the same time variation in the turning of the axle sections will be allowed so that as the vehicle is being turned the differential will compensate for unequal movement of the traction wheels. Where one wheel may be placed in a mud hole, in soft earth, or in some other location where a firm grip and hold is not to be had, this connection of the drive through the differential will be such that the wheel which is holding will remain stationary while the free wheel will be caused to spin and thus the proper driving power is not applied, and under such circumstances the operating rod will be moved to cause connection of the clutch section 43 with the clutch section 42 which couples the two sections of the drive axle together in such relation that these parts turn together and consequently power will be transmitted to the wheel which is holding on firm ground while the wheel which does not have a proper tread hold is not permitted to spin.

From the foregoing it will be seen that I have provided a transmission and differential gearing which is housed as a unit and which has the parts thereof so arranged that speed variations may be accomplished by direct change of the gears transmitting to the drive axle without destroying or in anywise disturbing the function of the differential, while at the same time means is permitted which will connect the sections of the drive axle which are ordinarily controlled only through the differential, in such a manner that each section of the shaft will be held against movement independently of the remaining section.

While I have herein shown and described only one specific form of the device, it will be understood that a number of variations and changes might be resorted to in the form and arrangement of the several parts without departing from the spirit and scope of my invention, and hence I do not wish to be limited to the exact disclosure but only to such points as may be set forth in the claims.

I claim:

1. A transmission mechanism for motor vehicles comprising in combination with a two part drive shaft, a differential shaft connected to receive turning movement from the power unit of the vehicle, gear wheels mounted rigidly on each of the parts of the drive shaft, sliding gears mounted on the differential shaft to be thrown into and out of mesh with the gear wheels of the axle, and means to simultaneously shift the gears on the differential shaft into and out of mesh with the gears carried by each of the parts of the drive shaft.

2. A transmission mechanism for motor vehicles comprising in combination with a two part drive shaft, a two part differential shaft, differential gearing connected in the differential shaft and connected with the driving power unit of the vehicle, gears rigidly connected on the two parts of the drive shaft, differential gears slidably mounted on the parts of the differential shaft, and means to simultaneously shift the gears on the differential shaft to mesh with and be released from the gears on the drive axle.

3. A transmission mechanism for motor vehicles comprising in combination with a two-part driven shaft, a divided differential shaft connected to receive turning movement from the power unit of the vehicle, gear wheels mounted rigidly on each of the parts of the driven shaft, sliding gears mounted on the divided differential shaft to be drawn into and out of mesh with the gear wheels of the driven shaft, means to simultaneously shift the gearing on the differential shaft into and out of mesh with the gearing carried by each of the parts of the driven shaft, and means arranged within the control of the operator to be shifted to lock the two parts of the driven axle to turn together.

4. A transmission mechanism for motor vehicles comprising in combination with a two-part driven shaft, a divided differential shaft mounted parallel to the drive shaft and having connection to receive turning movement from the power unit of the vehicle, change speed gears mounted on the two parts of the driven shaft and on the parts of the differential shaft, the gears on one of said shafts being fixedly mounted while the gears on the remaining shaft are mounted to have sliding movement along the length thereof, and means within the control of the operator to be actuated to simultaneously shift the slidable gears into and out of mesh with the fixed gears.

5. A transmission mechanism for motor vehicles comprising in combination with a two part drive shaft, a two part differential shaft, differential gearing connected in the differential shaft and connected with the driving power unit of the vehicle, gears rigidly connected on the two parts of the drive shaft, differential gears slidably mounted on the parts of the differential shaft, means to simultaneously shift the gears on the differential shaft to mesh with and be released from the gears on the drive axle, and means arranged to be within the control of the operator to be actuated to connect the two parts of the drive axle to turn together.

6. A transmission mechanism for motor vehicles comprising in combination with a two-part drive axle, a two-part differential shaft mounted adjacent to said drive axle, differential gearing connected in the differential shaft and arranged to impart driving movement to the shaft from the power unit of the vehicle, sets of gears of different sizes mounted on each of the parts of the drive axle, and sets of gears arranged on the parts of the differential shaft to be capable of shifting movement thereon to vary the speed of transmission from the differential shaft to the drive axle as various gears on the differential shaft and drive axle may be brought into mesh.

7. A transmission mechanism for motor vehicles comprising in combination with a two part drive axle, a two-part differential shaft mounted adjacent to said drive axle, differential gearing connected in the differential shaft and arranged to impart driving movement to the shaft from the power unit of the vehicle, sets of gears of different sizes mounted on each of the parts of the drive axle, sets of gears arranged on the parts of the differential shaft to be capable of shifting movement thereon to vary the speed of transmission from the differential shaft to the drive axle as various gears on the differential shaft and drive axle may be brought into mesh, a gear wheel mounted adjacent to the differential shaft and arranged as an idler, shifting means for the sets of gears on the differential shaft provided with rack bars placed in mesh with the idler gear, and means to impart turning movement to said gear to cause simultaneous shifting of the sets of gears on the differential shaft.

8. A transmission mechanism for motor vehicles comprising in combination with a two-part drive axle, a two-part differential shaft mounted adjacent to said drive axle, differential gearing connected in the differential shaft and arranged to impart driving movement to the shaft from the power unit of the vehicle, sets of gears of different sizes mounted on each of the parts of the drive axle, sets of gears arranged on the parts of the differential shaft to be capable of shifting movement thereon to vary the speed of transmission from the differential shaft to the drive axle as various gears on the differential shaft and drive axle may be brought into mesh, a gear wheel mounted adjacent to the differential shaft and arranged as an idler, shifting means for the sets of gears on the differential shaft provided with rack bars placed in mesh with the idler gear, means to impart turning movement to said gear to cause simultaneous shifting of the sets of gears on the differential shaft, and means arranged within the control of the operator to be shifted to lock the two parts of the drive axle to turn together.

In testimony whereof I affix my signature in presence of two witnesses.

ROLANDUS G. HOTSINPILLER.

Witnesses:
   I. S. ROBERTS,
   EDWARD LEWIS.